United States Patent Office 2,823,232
Patented Feb. 11, 1958

2,823,232

PREPARATION OF 2,3-DICHLOROISOBUTYRATES

Harold F. Wilson, Moorestown, N. J., assignor to Rohm & Haas Company, Philadelphia, Pa., a corporation of Delaware No Drawing. Application January 25, 1957
Serial No. 636,239

5 Claims. (Cl. 260—539)

This invention concerns a process for preparing salts of 2,3-dichloroisobutyric acid. According to this invention a lower alkyl methacrylate may be taken as a convenient starting material and chlorinated to give an ester of 2,3-dichloroisobutyric acid, which is then saponified with aqueous alkali metal hydroxide solution at controlled concentrations and temperatures and the resulting salt is isolated below its decomposition temperature.

The preparation of methyl and ethyl 2,3-dichloroisobutyrates is already known. Saponification processes applied to these esters, according to the art, lead to unsaturated products. Treatment of closely similar esters, the 2,3-dichloropropionates, with alkaline agents, has been shown to lead to $\alpha$-chloroacrylates. On the other hand, acid hydrolysis of 2,3-dichloropropionates requires prolonged action at reflux temperatures with mediocre conversions and development of by-products, as might be expected. Acid hydrolysis applied to 2,3-dichloroisobutyrates is likewise an unprofitable method.

Direct chlorination of acrylic and methacrylic acid has been reported in J. Amer. Chem. Soc. 78, 6123 (1956), where it was stated on pages 6126 and 6127 that the chlorinated acid products, whatever they actually are, were found quite sensitive to elimination of HCl and had to be "processed quickly." From methacrylic acid a 30% yield based on starting acid was obtained of a yellow oil which was chiefly a chlorinated acid, which product, however, was noted as being quite unstable. From this exposition it would appear that the sodium salt of 2,3-dichloroisobutyric acid would not be obtainable or would likewise be unstable. In contrast we have found that by following the procedure detailed below, it is now possible to obtain colorless, stable salts of 2,3-dichloroisobutyric acid.

Other investigators also have observed that, under some conditions, esters of 2,3-dichloroisobutyric acid can be dehydrohalogenated. We have found that various products may result. Treatment of these esters with a strong base may, for example, yield as on treatment with an alkali metal alkoxide or with an alkali metal hydroxide, under some conditions, a metal chloride and a water-insoluble product. On the other hand, such bases as calcium or ammonium hydroxide do not saponify the esters. Yet, we have found that by proper control of concentration of an alkali metal hydroxide, temperature of reaction, and conditions of drying, it is possible to convert lower alkyl esters of 2,3-dichloroisobutyric acid into relatively stable, pure salts.

Preparation of lower alkyl esters of 2,3-dichloroisobutyric acid by chlorination of alkyl methacrylates in the presence of a catalyst has been proposed. The presence of 1% to 10% of a carboxylic amide in the reaction mixture has now been found highly effective for catalyzing the desired chlorination. Chlorine is passed into the mixture of alkyl methacrylate and an amide such as dimethylformamide, N,N-dimethylacetamide, N-methylacetamide, N-methylformamide, morpholineformamide, or methacrylamide, at a temperature from 20° to 50° C. until the theoretical amount of chlorine has been taken up. Free chlorine may be taken off under reduced pressure and the reaction mixture washed with water. The crude chlorinated ester may be used for saponification or it may be further purified, as by distillation.

For saponifying the alkyl 2,3-dichloroisobutyrates, there is used a strong hydroxide in an aqueous mixture. In the mixture of ester, hydroxide, and water, there should be from about 8% to 20% of a strong base, such as sodium or potassium hydroxide, the amount thereof being about equivalent to the ester which may vary from about 30% to 60% of the mixture, the balance being water. It is necessary to mix a strong aqueous alkali hydroxide solution with the alkyl 2,3-dichloroisobutyrate or with a mixture of such ester and water at a rate permitting control of temperature below about 50° C. The reaction mixture is kept between 20° and 50° C., preferably 30° and 40° C. during the saponification reaction. Temperature may be controlled by rate of mixing and external cooling. The time of reaction will vary from about three hours to about 20 minutes, depending on reactants and conditions.

The resulting solution is then treated to separate the salt formed. A convenient way to do this is to subject the solution to evaporation under conditions yielding a solid, best in the form of separate particles. For example, the solution may be vacuum dried, best at temperatures below 60° C. Also, the solution may be spray-dried, provided excessive temperatures are not used. Inlet temperatures of heated air or other gas may be up to 600° F. with an outlet gas temperature below about 340° F. The solid formed should be below 200° F. when collected. The spray-drying temperatures are adjusted to the concentration of the solution supplied, the more dilute solutions permitting higher temperatures and the more concentrated being dried at relatively lower temperatures. For example, a 40–45% solution can be successfully dried up to 600° F. inlet and 340° F. outlet temperatures, while with a 60–65% solution it is best to dry at 375°–400° F. inlet and about 225°–250° F. outlet temperatures. In either case, these temperatures are adjusted to yield a dry solid product in the spray-drying operation. In any case, the drying temperatures are kept below those which would cause decomposition of the desired salt. The salt may also be separated by crystallizing a cooled solution concentrated under reduced pressure (best below 60° C.).

The dry product is stable on storage. Solutions of sodium 2,3-dichloroisobutyrate tend to decompose slowly. Yet, the solid seems stable even when it has picked up moisture from the air and even in the form of a paste resulting from absorbed moisture. The solutions are definitely lacking in stability. For example, a 53% solution stored at about 25° C. lost about 6% of its sodium 2,3-dichloroisobutyrate content in 28 days and 22% in 116 days.

Further details of typical preparations are given in the following illustrative examples. Parts are by weight unless otherwise designated.

Example 1

(a) Chlorine is slowly run into a mixture of 1500 parts of methyl methacrylate and 60 parts of dimethylformamide at 27°–40° C. until 1295 parts are absorbed. The reaction mixture is warmed to about 60° C. and subjected to reduced pressure to remove free chlorine. The reaction mixture is distilled to give at 75°–78° C./25 mm. methyl $\alpha,\beta$-dichloroisobutyrate. The product as obtained has a refractive index, $n_D^{20.5}$, of 1.4494. It contains by analysis 40.5% of chlorine (theory 40.2%).

(b) To 1931 parts of this methyl 2,3-dichloroisobutyrate is added 3069 parts of an aqueous 15.5% sodium hydroxide solution over a one-hour period while the temperature of the reaction mixture is held below 40° C.

(c) A portion of the resulting solution is heated to about 40° C. under reduced pressure which is carried down to about 6 mm. The resulting solid is further dried at 80° C. for five hours. The dried solid decomposes at 170°–175° C.

Another portion of the above solution is spray-dried after it is stripped of methanol by warming it under reduced pressure. An inlet air temperature of 600° F. is used. The outlet temperature is 340° F. The product obtained contains 0.28% of water.

(d) An aqueous 40% solution of sodium 2,3-dichloroisobutyrate is acidified with concentrated hydrochloric acid. An oil forms and is separated. It is distilled at 130°–134° C./35 mm. and is identified as 2,3-dichloroisobutyric acid. It has a refractive index, $n_D^{20}$, of 1.4677.

*Example 2*

(a) Methyl methacrylate is chlorinated as above in the presence of 4% by weight of dimethylformamide, the reaction temperature being kept between 40° and 50° C. by cooling. A 5% excess of chlorine is supplied. The reaction mixture is washed three times with water and is then stripped of volatile material at 80° C./30 mm. The product is identified as methyl 2,3-dichloroisobutyrate.

(b) There are mixed 1593 parts of this methyl 2,3-dichloroisobutyrate and 511 parts of water and thereto is slowly added aqueous 50% sodium hydroxide solution to a total of 759 parts, while the reaction mixture is maintained at 30°–40° C. The reaction mixture is now stirred for a half hour at 40° and heated to 50° C. under 100 mm. pressure to strip off methanol.

(c) The solution is spray-dried with the inlet air temperature at 375°–400° F. and the outlet temperature at 225°–235° F. A dry, finely divided product is obtained, which is identified as sodium 2,3-dichloroisobutyrate.

In place of sodium hydroxide there can be used potassium hydroxide to give the potassium salt. In place of the above methyl ester there may be used the ethyl or propyl or butyl esters. In each case the desired salt of 2,3-dichloroisobutyric acid is obtained.

The soluble salts of 2,3-dichloroisobutyric acid and the acid itself are potent plant growth regulators. They exhibit selective action which can be used to advantage, as compared with other chlorinated acids and their salts.

I claim:

1. A process for preparing an alkali metal salt of 2,3-dichloroisobutyric acid which comprises reacting a mixture of a lower alkyl ester of 2,3-dichloroisobutyric acid, water, and an alkali metal hydroxide between about 20° and 50° C. for a time from about three hours to about twenty minutes, the hydroxide being about equivalent to the said ester and forming about 8% to 20% of the said mixture and isolating the resulting salt below its decomposition temperature.

2. A process for preparing an alkali metal salt of 2,3-dichloroisobutyric acid which comprises reacting a mixture of a lower alkyl ester of 2,3-dichloroisobutyric acid, water, and an alkali metal hydroxide between 20° and 50° C. for a time from about three hours to 20 minutes, the amount of said hydroxide being about equivalent to the said ester in the mixture and forming 8% to 20% of the said mixture, and spray-drying the reacted mixture with a gas inlet temperature not over 600° F. and a gas outlet temperature not over 340° F.

3. A process according to claim 2 wherein the alkali metal hydroxide is sodium hydroxide.

4. A process for preparing an alkali metal salt of 2,3-dichloroisobutyric acid which comprises reacting a mixture of a lower alkyl ester of 2,3-dichloroisobutyric acid, water, and an alkali metal hydroxide between 20° and 50° C. for a time from about three hours to 20 minutes, the amount of said hydroxide being about equivalent to the said ester in the mixture and forming 8% to 20% of the said mixture, and drying the reaction mixture under reduced pressure and at temperatures not over 60° C.

5. A process according to claim 4 wherein the alkali metal hydroxide is sodium hydroxide.

No references cited.